United States Patent [19]

Zurawski

[11] Patent Number: 5,126,964
[45] Date of Patent: * Jun. 30, 1992

[54] HIGH PERFORMANCE BIT-SLICED MULTIPLIER CIRCUIT

[75] Inventor: John H. Zurawski, Boxborough, Mass.

[73] Assignee: Digital Equipment Corporation, Maynard, Mass.

[ * ] Notice: The portion of the term of this patent subsequent to Jul. 10, 2007 has been disclaimed.

[21] Appl. No.: 514,719

[22] Filed: Apr. 26, 1990

Related U.S. Application Data

[63] Continuation-in-part of Ser. No. 176,735, Apr. 1, 1988, Pat. No. 4,941,121.

[51] Int. Cl.$^5$ ............................. G06F 7/52; G06F 7/38
[52] U.S. Cl. ......................................... 364/757; 364/749
[58] Field of Search ........................ 364/757, 754, 749

[56] References Cited

U.S. PATENT DOCUMENTS 4,800,517  1/1989  Asghar et al. ...................... 364/749
4,941,121  7/1990  Zurawski ............................. 364/757

OTHER PUBLICATIONS

Zurawski, et al., "Floating Point in the VAX 8800 Family," Digital Technical Journal, No. 4, Feb. 1987, pp. 62–71.

Primary Examiner—Long T. Nguyen
Attorney, Agent, or Firm—Kenyon & Kenyon

[57] ABSTRACT

An apparatus for performing high performance multiplication in a computer central processor unit which implements a sliced design configuration. Each slice changes its "personality" by virtue of receiving consecutive bits of the multiplicand. The receipt of consecutive bits by each slice eliminates the need for the interconnection of successive slices in separate chips. Thus, the apparatus allows the avoidance of significant timing delays, inherent in such interchip connections, which diminish computer system multiplication performance, and allows the multiply cycle time to be as fast as a latch-to-latch transfer across chips. Each slice may include a binary multiplier for forming a product of two numbers on an iterative basis, an accumulator connected to the multiplier for adding the products from the multiplier, and a carry-out register connected to the accumulator for storing carry-out data.

23 Claims, 6 Drawing Sheets

HIGH PERFORMANCE BIT-SLICED MULTIPLIER CIRCUIT

CROSS-REFERENCE TO RELATED APPLICATION

This application is a continuation-in-part of applicant's U.S. application Ser. No. 176,735, entitled APPARATUS FOR HIGH PERFORMANCE MULTIPLICATION, filed Apr. 1, 1988, now U.S. Pat. No. 4,941,121.

FIELD OF THE INVENTION

This invention relates to arithmetic logic hardware of a digital computer. Specifically, it relates to bit-slice multiplication performed by arithmetic logic hardware of digital computers.

BACKGROUND OF THE INVENTION

Multiplication, in binary arithmetic, is generally accomplished by successive shift and add operations. The number to be multiplied is known as the multiplicand (MD), while the number by which the MD is multiplied is known as the multiplier (MR). Since, in the binary number system, an individual binary digit (bit, in the vernacular) can assume the value of 0 or 1 only, multiplication of bits is simple and straight forward. As is the case with decimal multiplication, any number, x, multiplied by 1 is equal to itself x; any number, x, multiplied by 0 is 0.

To perform binary multiplication, the MD is multiplied by each bit in the MR. Thus, when the MR bit in question is a 0, the partial product is 0 (represented by a string of 0s as long as the number of bits in the MD). When the MR bit in question is a 1, the partial product is simply the MD. The mechanics of binary multiplication are similar to those of decimal multiplication. As a consequence, binary multiplication is accomplished in a series of multiplicative iterations, one iteration for each bit in the MR, producing a series of partial products for summation. Therefore, binary multiplication is, in its most elemental form, nothing more than the addition of partial products which are either 0 or the MD. Furthermore, each partial product is shifted to the left by the number of bits corresponding to the bit position of the MR bit in question.

A typical computer hardware implementation of a binary multiplier consists of three n-bit registers, an n-bit binary shifting mechanism, and an n-bit adder. The MD and MR are stored, for the duration of the multiplication operation, in two of the registers. The third register stores the result of each iteration of the multiplication procedure, known as the partial product. The partial product, for any given iteration of the multiplication, is equal to the sum of the partial product of the previous iteration and the product of the particular MR bit in question and MD. The sum is formed by the n-bit adder. The product of the MR bit and MD will equal zero if the MR bit equals zero and will equal the MD, shifted left by the number of places equal to the MR bit location, if the MR bit equals one.

Some computer hardware designers employ a "bit-sliced" design to implement a binary multiplier. In a typical "sliced-design," with the slice size equaling the radix of each iteration, several basic binary multipliers (slices) are cascaded. That is, the output from the adder of one multiplier is connected to the partial product register of its neighboring multiplier.

A basic problem with bit-sliced multipliers is that they often take many slice stages (cells) to implement. With emitter coupled logic (ECL) or Gallium Arsenide (GaAs) microchip technology, multipliers are generally implemented in a sliced-design because of the limited number of cells each chip can hold and the limited chip pin count.

In typical prior art bit-sliced multiplier designs, the interchip connection between slices introduce relatively long delays significantly lengthening the time needed to complete a multiplication operation. One particular cause of interchip delay stems from the fact that with each interchip connection, time is consumed in voltage magnitude translations between chips.

SUMMARY OF THE INVENTION

It is an object of the present invention to accomplish bit-sliced multiplication in a way that avoids the need for time-consuming interchip connections at critical arithmetic paths thereby greatly improving operation speed.

The present invention eliminates undesirable interchip time delays associated with prior art bit-sliced multipliers by providing independent multiplier slices and by providing that each independent multiplier slice shall multiply each bit of multiplier data by each constituent multiplicand addend bit.

DETAILED DESCRIPTION

Figure 1:
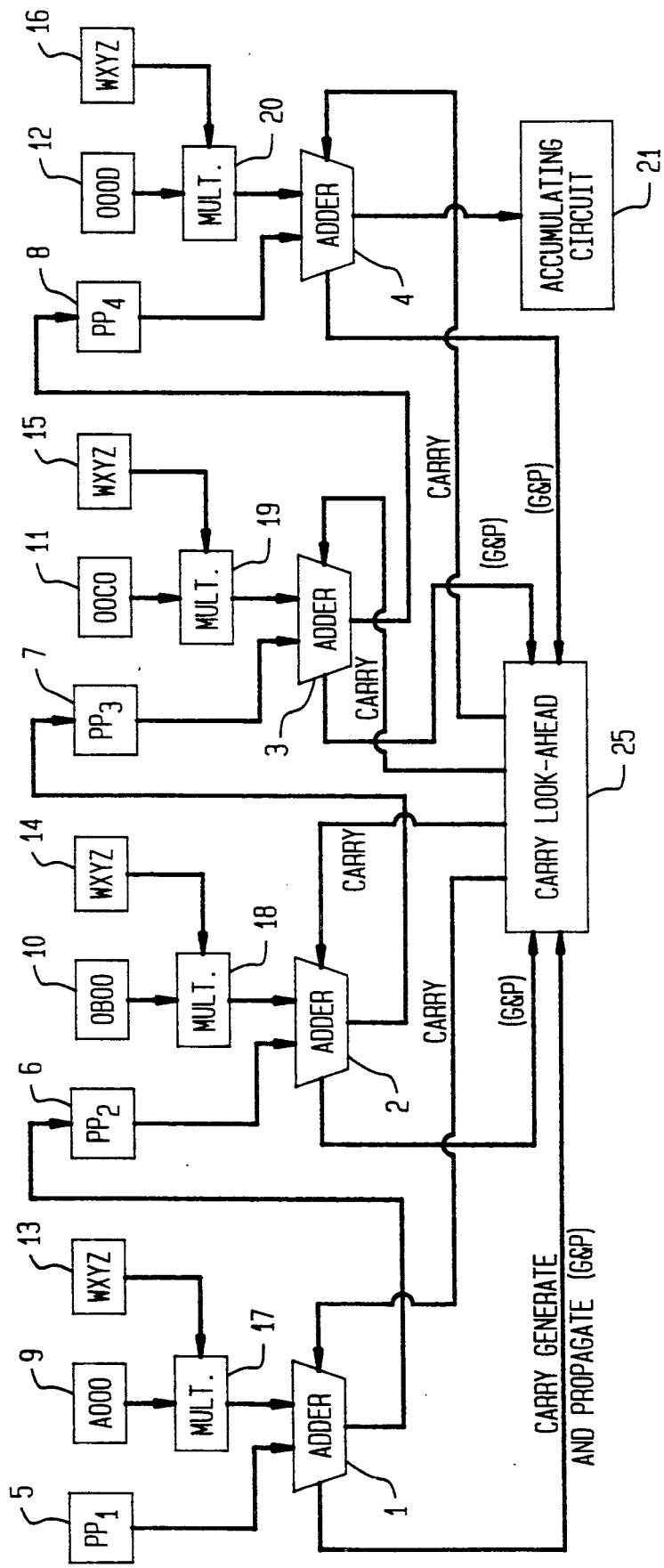
FIG. 1 depicts a prior art bit-sliced binary multiplier.

For clarity of explanation, the following description is directed to bit slices of one bit. The present invention can be extended to include multiple-bit slices. FIG. 1 depicts a typical prior art bit-sliced take advantage of the property that the product of two numbers is equal to the product of their constituent sums. That is, for a number X which equals A+B and a number Y which equals C+D, then X×Y=(A+B)×(C+D). Further, the distributive law provides that: X×Y=(A×C)+(A×D)+(B×C)+(B×D). Such a sum of products may also be indicated as: AC+AD+BC+BD. Thus, in bit-sliced multiplication, the MD is parsed into constituent addends. For example, a 4-bit binary number ABCD can be represented as A000, 0B00, 00C0 and 000D in the respective MD registers (9, 10, 11, 12) of the respective four slices. In operation, each slice multiplies each bit of the MR (for example, a 4-bit MR:WXYZ, contained in registers 13, 14, 15, 16) by its constituent of the MD in a binary multiplier (17, 18, 19, 20). Each slice multiplies its MD by bits Z, Y, X and W, in that order, passing on the sum of the product plus the partial product contained in registers 5, 6, 7 and 8 to the next slice in the design after each multiplicative iteration. The last slice passes its result to an accumulating circuit 21. The carry-out generates and propagates forwarded to a carry look ahead logic 25 which then generates a carry for each slice.

In order to eliminate the problems introduced by interchip signal transmission at the critical arithmetic path in the typical bit sliced multiplier, the present invention eliminates all such critical path interchip connections normally required during multiplier operation. For example, the interslice connection depicted in prior art FIG. 1 between the output of each slice's adder (1, 2 and 3) and its neighboring slice's partial product register (6, 7 and 8) is eliminated. In its place is an intraslice connection.

Figure 2:
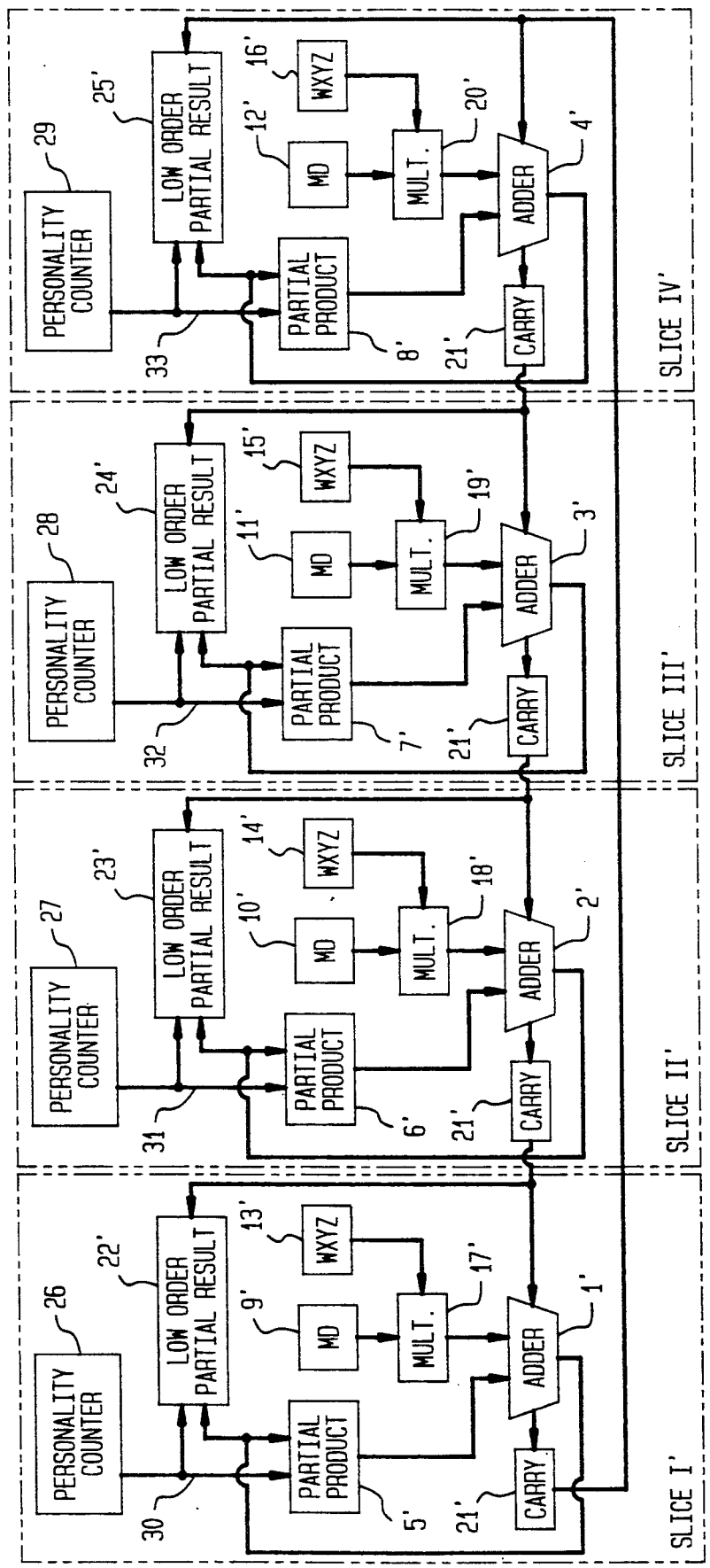
FIG. 2 depicts the present invention embodied in a four slice sample configuration.

FIG. 2 depicts the reconfigured slices of the present invention. In the configuration of this invention, each adder 1'-4' is connected to its associated partial product register 5'-8'. Since critical arithmetic path interslice connections are eliminated, it is a further aspect of the present invention that each individual slice changes its "personality" with each iteration of the binary multiplication. The "personality" of each slice is determined by a personality counter 26, 27, 28, 29. The personality determines the contents of the MD.

In the prior art, each individual slice would multiply its constituent bit of the MD by each bit of the MR, with each multiplicative iteration varying the particular bit of the MR used in the multiplication. For example, in FIG. 1, slice I would perform four multiplicative iterations: the first being the product of its multiplicand constituent, A000, and 000Z; the second being the product of A000 and 00Y0; the third being the product of A000 and OX00; and the fourth being the product of A000 and W000. At the conclusion of each individual multiplicative iteration in the prior art, the results would be passed, by an interchip connection, to the partial product register of the succeeding slice which would also be performing multiplicative iterations concurrently on its data. The slices perform their multiplicative iterations in unison. Partial products from preceding slices would be included in each slice's iteration through each slice's adder (1-4). For example, in the first multiplicative iteration of slice II, the partial product register is cleared, i.e., contains all zeros, so the result of the iteration is simply the product of slice II's constituent of the MD, 0B00, and 000Z. In the second multiplicative iteration, the results from slice I's first iteration appear in slice II's second iteration, added to the product of 00C0 and 00Y0.

In the prior art, each slice's constituent of the MD remained constant for the duration of the entire multiplication procedure i.e., for all required iterations. For example, in slice I, register 9 contains the datum A000, for all required iterations. Unlike the prior art, each slice of the present invention varies its constituent of the MD with each iteration. Each slice will begin the procedure with a different constituent bit of the MD. At the conclusion of each iteration, each slice will have loaded into its MD register the value of the next lower significant bit of the MD. If, during an iteration, a slice is addressing the least significant bit of the MD, its MD register shall be loaded with the most significant bit of the MD for the next iteration. Iterations continue until a slice has used each bit of the MD. Thus, in the present invention, for example, slices I', II', III', IV' will change their personality with each succeeding iteration. In the first iteration, slice I' will have, as its constituent of the MD the number A000. In its second iteration, slice I' will have, as its constituent of the MD, the number 0B00. In the third and fourth iterations, its constituent of the MD will be 00C0 and 000D, respectively. The other slices (II'-IV') also change their personalities on an iteration basis: slice II' cycles through the MD constituents 0B00, 00C0, 000D and A000; slice III' cycles through 00C0, 000D, A000 and 0B00; and slice IV' 219 cycles through 000D, A000, 0B00 and 00C0.

Although in the present invention the arithmetic critical path interslice connections are eliminated, there are still some interconnections between slices of a non-critical nature. Specifically, referring to FIG. 2, the carry-out bit from each slice's adder (1', 2', 3', 4') is fed through one one-bit register 21' to the carry-in port of the slice immediately to the left of the slice in question. The carry-out bit from slice I' is passed through one one-bit register 21' to the carry-in port of slice IV'.

After a slice I', II', III', IV' changes its personality from the least significant slice to the most significant slice, the present invention provides that the result of each such slice's adder 1', 2', 3', 4', is loaded into a low order partial result register 22', 23', 24', 25' and that each such slice initializes its DD/PR-Register (5', 6', 7', 8') and initializes the carry in signal. The loading and initialization of the low order partial result register 22', 23', 24', 25' and DD/PR Register 5', 6', 7', 8', respectively, is controlled by the personality counter 26, 27, 28, 29, which is counted by a control line 30, 31, 32, 33 to each of the low order partial result registers and the DD/PR register.

As a result of the individual slices cycling through all their iterations, each slice assuming the whole range of possible personalities, the answer to the multiplication can be determined by the concatenation of the DD/PR-Registers and the DD/PR data saved in the multiple word registers. Beginning with the DD/PR-Register of the most significant slice and moving right, each succeeding DD/PR-Register is concatenated in a summing register 26' until the registers from slices I', II', III' and IV' are placed side by side. The concatenation continues with the saved DD/PR data from the low order partial result registers (22', 23', 24', 25') with the most significant saved DD/PR data placed next to the least significant DD/PR-Register data already concatenated (in this case, that from slave slice IV'). Each lesser significant slice's saved DD/PR data is concatenated until all four of such DD/PR data words are in place. The result is a new large word comprised of, in order, eight pieces of data beginning with the DD/PR-Registers (5', 6', 7', 8') and ending with the saved DD/PR data from the low order partial result registers (22', 23', 24', 25'). To the individual components of this large word are added the carry bits associated with such components: the one carry-in bit stored in registers 21' are added to the DD/PR-Register data. The result of the addition of these carry bits to the components of the concatenated large word is the answer to the multiplication problem.

Figure 3:
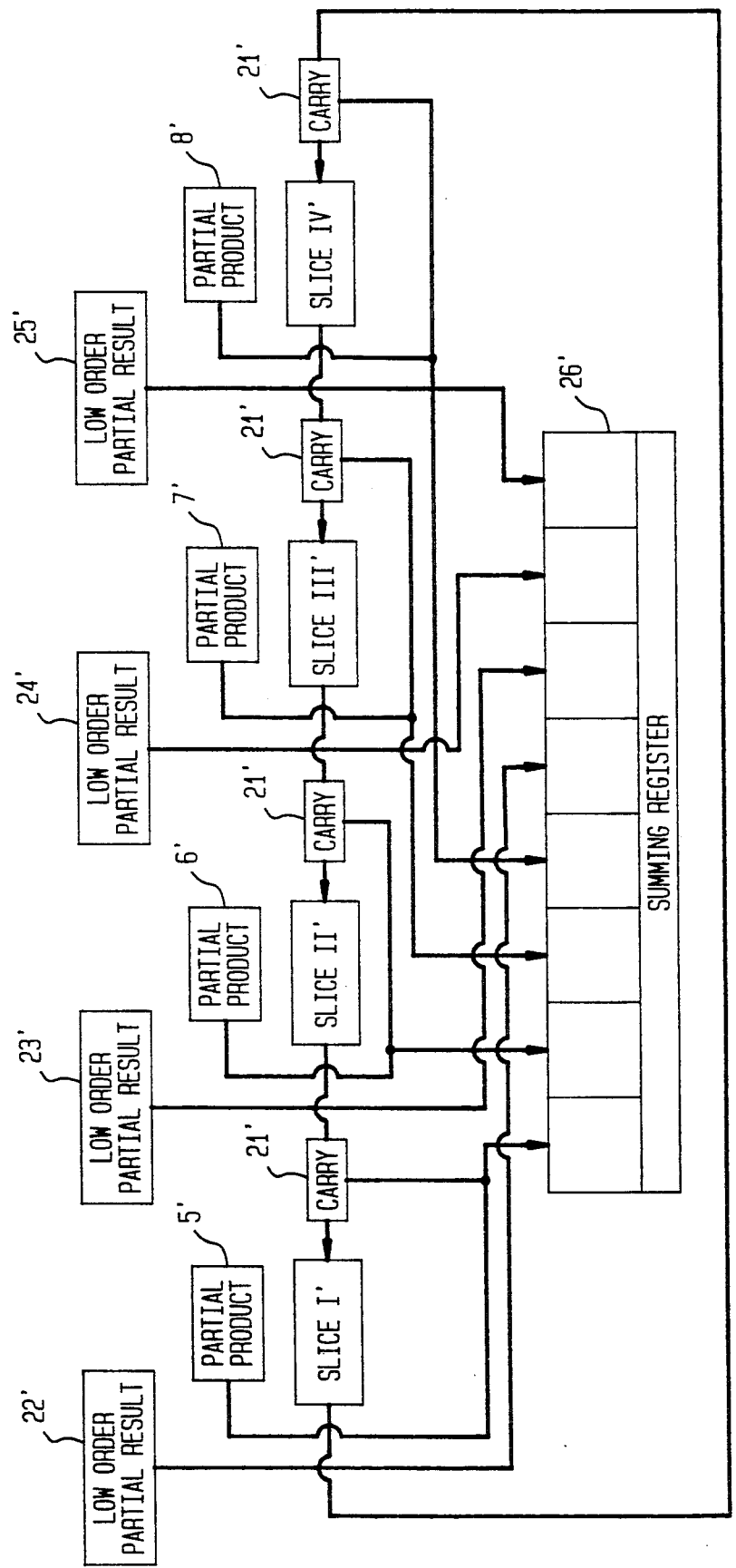
FIG. 3 depicts a simplified version of FIG. 2, further including the apparatus for completing the multiplication.

FIG. 3 is a simplified version of FIG. 2 with further detail of the concatenation procedure. FIG. 3 includes the summing register 26' and depicts the interconnections between the summing register 26' and the multiple word registers (22', 23', 24', 25'), the DD/PR-Registers (5', 6', 7', 8') and the carry-out registers 21'.

FIG. 2 shows one way of varying the individual portions of the MD and MR on an iterative basis. In the circuit of FIG. 2, the control for doing this is associated with each MD and MR register in each slice. However, other techniques can also be employed.

Figure 4:
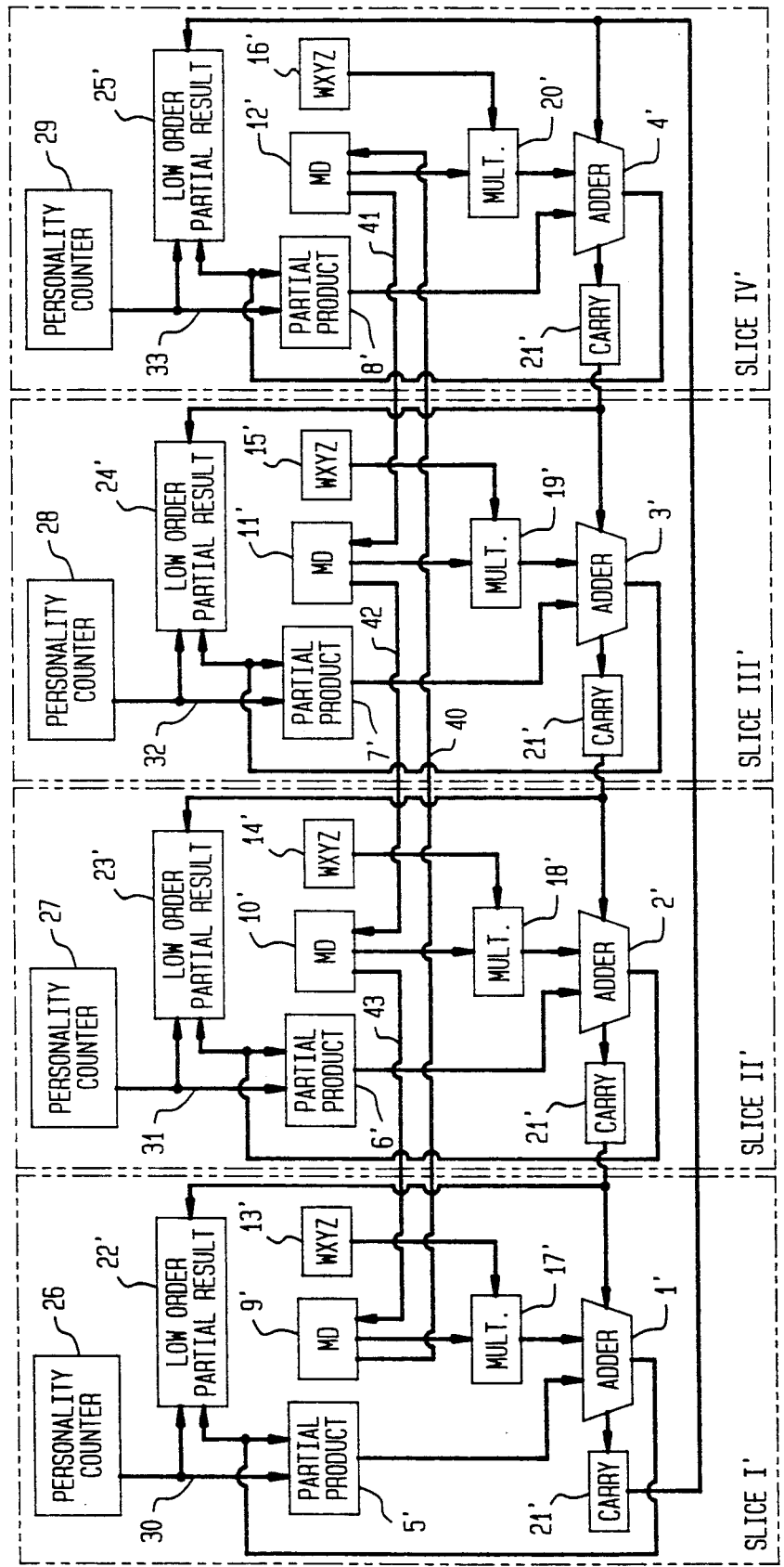
FIG. 4 depicts a modified version of FIG. 2 showing a loop for passing bits of a multiplicand.

For example, FIG. 4 shows a modified version of the circuit shown in FIG. 2, where the MD- registers are tied together in a loop (40, 41, 42, 43). Each MD-register 9', 10', 11', 12' holds the bit or bits of the MD needed by a slice for a given iteration. Once the slices I', II', III', IV' begin using the portion of the MD they need for their current iteration, each register can pass its contents to a neighboring slice's MD register for use in the next iteration, achieving the desired variations in slice personality. In this way, each individual MD-register 9', 10', 11', 12' need not maintain the entire MD; rather, the MD is shared among the slices I', II', III', IV'. Note that the MD register-to-MD register inter-chip connections 40, 41, 42, 43 are similar to the carry-out bit inter-chip connections discussed above, in terms of non-time-criticality, as a result of register-to-register data transfer.

Figure 5:
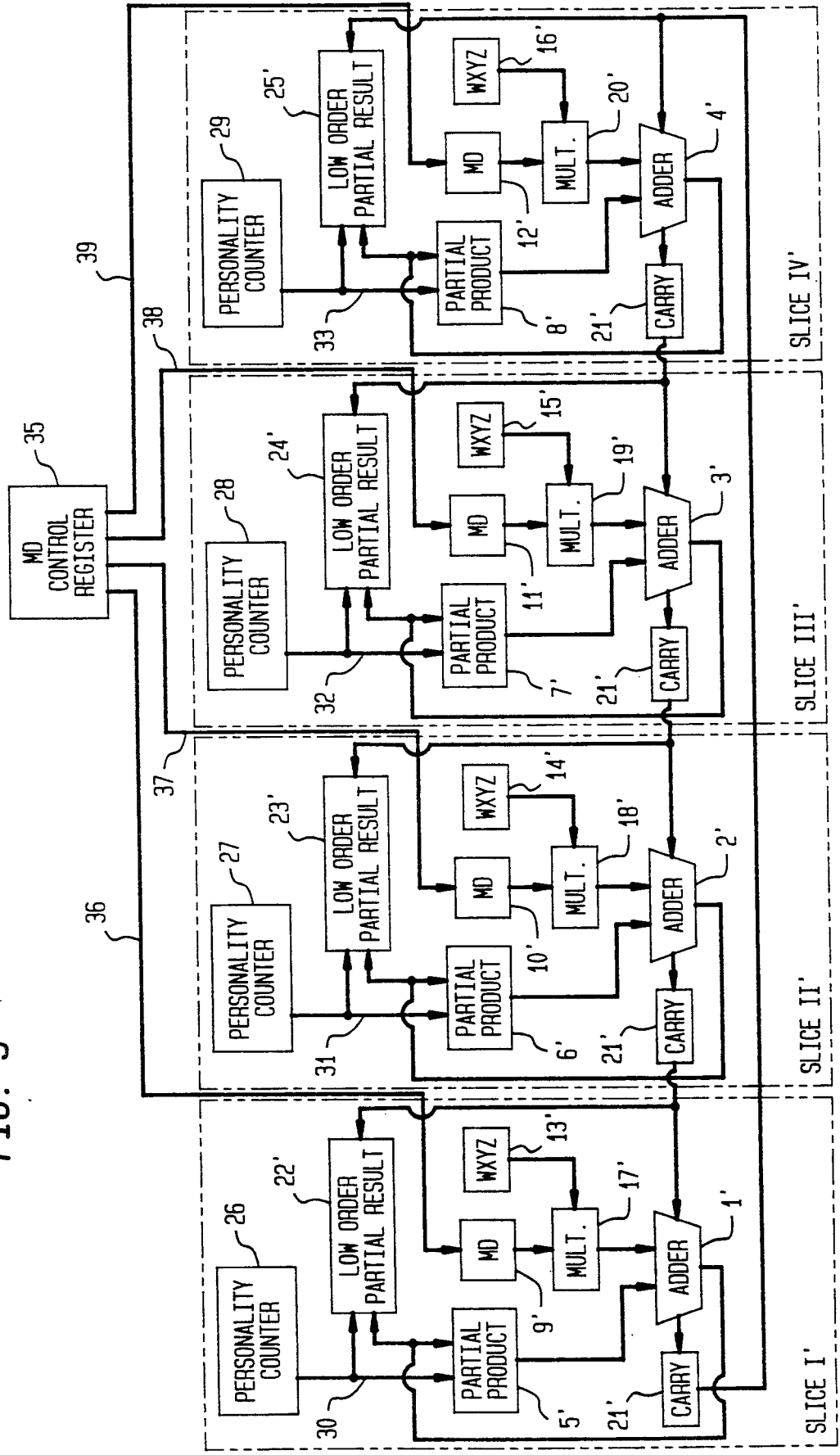
FIG. 5 depicts a modified version of FIG. 2 showing a centralized control of multiplicand bits for the slices.

Another example is shown in FIG. 5, where centralized control is shown. In this case, appropriate bits of the MD are supplied to each slice I', II', III', IV' for use in the next iteration by an MD Control Register 35 (which could comprise a circular shift register) by conductors 36, 37, 38, 39. The MD Control Register 35 varies the bits sent to each slice I', II', III', IV' to achieve the slice personality changes desired for each successive iteration. So, for example, slice I' receives bit A for use in its first iteration, bit B for its next iteration, bit C for the third iteration, and bit D for the last iteration. Slice II, receives, in order, bit B, bit C, bit D and bit A, and so on for slices III' and IV'. As is the case with the circuit shown in FIG. 4, this circuit can employ smaller MD registers, since they need not store the entire MD. Also, the connections 36, 37, 38, 39 between the MD Control Register 35 and each slice's MD- register 9', 10', 11', 12' are similar, in terms of non-time-criticality, to the inter-chip connections discussed in reference to FIG. 4.

Figure 6:
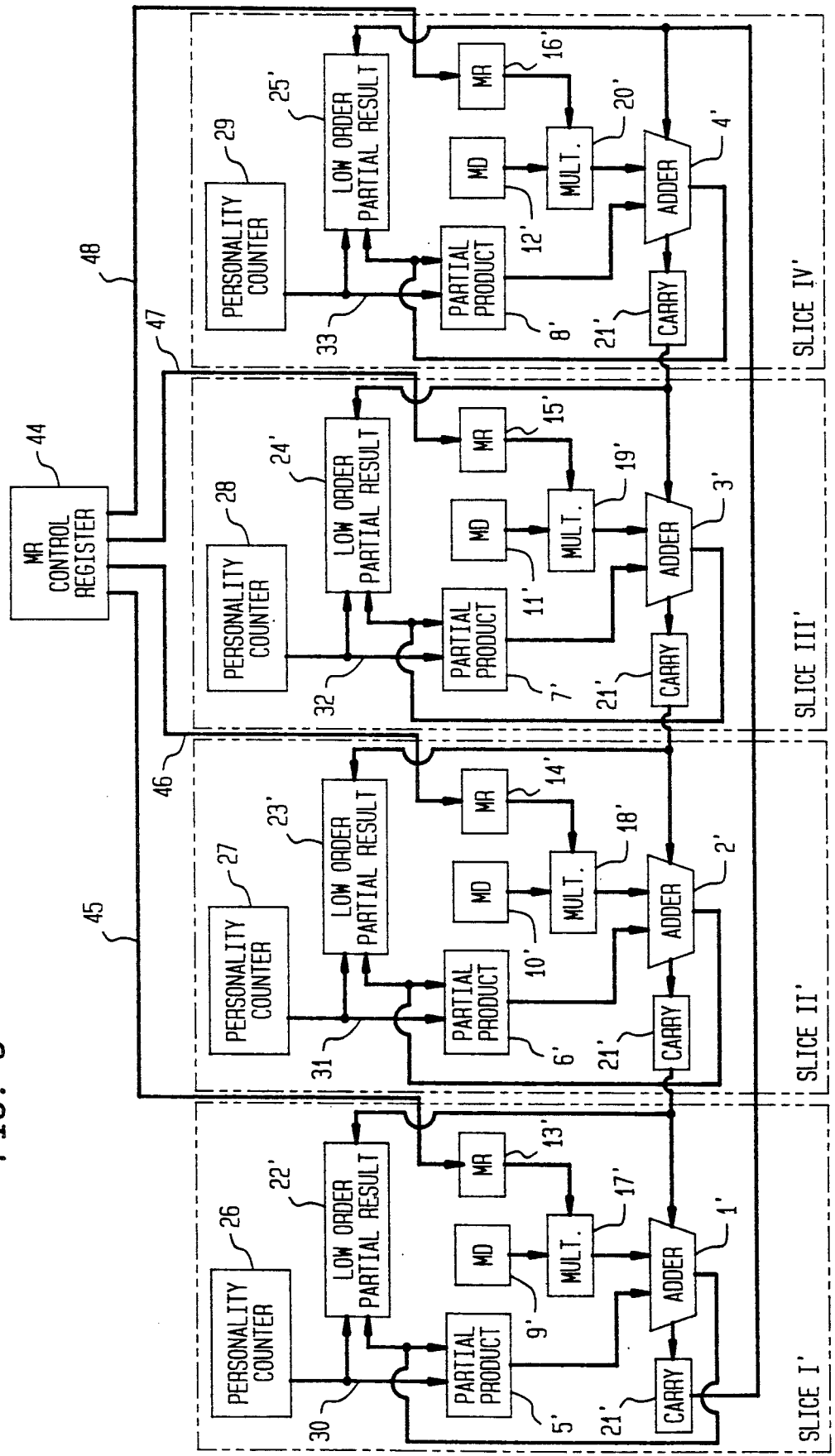
FIG. 6 depicts a modified version of FIG. 2 showing a centralized control of multiplier bits for the slices.

Regarding the variation of the MR bits in the present invention, FIG. 6 shows how such variation may be accomplished by use of an MR Control Register 44. Over conductors 45, 46, 47 and 48, the MR Control Register 44 transfers the necessary bits to each slice's MR register 13', 14', 15', 16'. Each slice I', II', III', IV' receives the same bit or bits for use in each iteration. For example, slices I'-IV' each receive bit Z for use in the first iteration, bit Y for use in the second, bit X for use in the third, and finally bit W for use in the fourth. As is the case with the MD registers discussed in reference to FIGS. 4 and 5, the MR registers 13', 14', 15', 16' need only be large enough to hold the bit or bits used in each iteration, not the entire MR. Also, the connections 45, 46, 47, 48 between the MR Control Register 44 and each slice's MR- register 13', 14', 15', 16' have the same non-time-criticality as discussed previously, due to the use of register-to-register data transfer.

I claim:

1. A bit-sliced multiplier circuit, said multiplier circuit comprising a plurality of multiplier slices for independently performing multiplication of a multiplicand with a multiplier on an iterative basis, each of said multiplier slices comprising:

a. a multiplier circuit for forming a product of two numbers on an iterative basis, one of said numbers comprising one or more bits of a multiplicand and the other of said numbers comprising one or more bits of a multiplier, said multiplier circuit comprising means for storing said one or more bits of a multiplicand;

b. an accumulator circuit, connected to said multiplier circuit, for adding and storing the products from said multiplier circuit on an iterative basis; and c. a carry-out register, connected to said accumulator circuit, for storing carry-out data;

each slice's means for storing said one or more bits of a multiplicand connected to the means for storing said one or more bits of a multiplicand of adjacent slices, such that a personality of each slice can change on an iterative basis; and such that each slice of said bit-sliced multiplier circuit is connected to an adjacent slice only through interconnections of a non-critical nature.

2. The bit-sliced multiplier circuit of claim 1 wherein said interconnections of a non-critical nature include a connection of one slice to the carry-out register of an adjacent slice.

3. The bit-sliced multiplier circuit of claim 1 further comprising a summing register, connected to said accumulator circuit of each slice, for storing results of iterations of each slice after all such iterations are completed.

4. A bit-sliced multiplier circuit, said multiplier circuit comprising:

A. multiplier slices for independently performing multiplication of a multiplicand and a multiplier on an iterative basis, each of said multiplier slices comprising:

(1) a multiplier circuit for forming a product of two numbers on an iterative basis, one of said numbers comprising one or more bits of the multiplicand and the other of said numbers comprising one or more bits of the multiplier, said multiplier circuit comprising means for storing said one or more bits of a multiplicand;

(2) a partial product register for storing the products of past iterations;

(3) an adder circuit, connected to said partial product register and said multiplier circuit, for forming a partial product of a multiplication through the circuit iteration of the slice;

(4) a carry-out register, connected to said adder circuit, for storing carry-out data from said adder circuit;

each slice's means for storing said one or more bits of a multiplicand connected to the means for storing said one or more bits of a multiplicand of adjacent slices, such that a personality of each slice can change on an iterative basis; and such that each slice is connected to an adjacent slice only by interconnections of a non-critical nature; and B. a summing register, connected to the partial product register of each slice, for storing results of iterations of each slice after all such iterations are completed.

5. The bit-sliced multiplier circuit of claim 4 wherein a slice's adder circuit includes a carry-in input and said interconnections of a non-critical nature include the carry-in input to a slice's adder circuit being connected to the carry-out register of an adjacent slice.

6. A bit-sliced multiplier circuit, said multiplier circuit comprising:

A. multiplier slices for independently performing multiplication of a multiplication and a multiplier in an iterative fashion, each of said slices comprising:
- (1) a multiplicand register for storing one or more multiplicand bits;
- (2) a multiplier register for storing one or more multiplier bits;
- (3) multiplicand shift and add logic, connected to said multiplicand register and said multiplier register, for forming a product of said multiplicand and multiplier bits;
- (4) a partial product register for storing results of past iterations;
- (5) an adder circuit, connected to said partial product register and said multiplicand shift and add logic, for forming a partial product of a multiplication through the current iteration of a slice;
- (6) a carry-out register, connected to said adder circuit, for storing carry-out data from said adder circuit;
- (7) a low order partial result register, connected to said adder circuit, for storing a partial product from a slice's adder circuit after the slice changes personality from that of the least significant slice to that of the most significant slice;

each slice's multiplicand register connected to the multiplicand register of adjacent slices, such that the personality of each slice can change on an iterative basis; and such that each slice is connected to an adjacent slice only by interconnections of a non-critical nature; and B. a summing register, connected to each slice's partial product register, low order partial result register and carry-out register, for concatenating the contents of the partial product register and low order partial result register and for summing the contents of carry-out register with said concatenation after all iterations are performed in each of the slices.

7. The bit-sliced multiplier circuit of claim 6 wherein a slice's adder circuit includes a carry-in input and said interconnections of a non-critical nature include the carry-in input to a slice's adder circuit being connected to the carry-out register of an adjacent slice.

8. A bit-sliced multiplier circuit, said multiplier circuit comprising:
- A. a plurality of multiplier slice circuit, each of said multiplier slice circuits comprising:
  - (1) a personality counter, for indicating a personality of the multiplier slice on an iterative basis;
  - (2) a multiplicand register for storing one or more bits of a multiplicand;
  - (3) a multiplier register, for storing one or more bits of a multiplier;
  - (4) multiplicand shift and add logic, connected to said multiplicand register and said multiplier register, for forming a product of said one or more bits of the multiplicand with said one or more bits of the multiplier;
  - (5) a partial product register;
  - (6) a carry-out register for storing a carry-out result from an adder circuit;
  - (7) said adder circuit, connected to said multiplicand shift and add logic, said partial product register, said carry-out register and an adjacent multiplier slice's carry-out register, for adding contents stored in said multiplicand shift and add logic, said partial product register and said adjacent multiplier slice's carry-out register, and for depositing the result in said partial product register;
- (8) a low order partial result register, connected to said personality counter, said adjacent multiplier slice's carry-out register and said adder circuit, for storing a sum of the contents of said adder circuit and the contents of said adjacent multiplier slice's carry-out register after the slice changes its personality from that of the least significant slice to the most significant slice;

each slice's multiplicand register connected to the multiplicand register of adjacent slices, such that the personality of each slice can change on the iterative basis; and such that each slice is connected to an adjacent slice only by interconnections of a non-critical nature; and B. a summing register for concatenating the contents of the partial product register of each multiplier slice and for summing the contents of each adjacent multiplier slice's carry-out register to form the more significant half of the summing register contents and for concatenating the contents of the low order partial result register of each multiplier slice to form the less significant half of the summing register contents.

9. A bit-sliced multiplier circuit, said multiplier circuit comprising a plurality of multiplier slices for independently performing multiplication of a multiplicand with a multiplier on an iterative basis, each of said multiplier slices comprising:
- a. a multiplier circuit for forming a product of two numbers on an iterative basis;
- b. an accumulator circuit, connected to said multiplier circuit, for adding and storing the products from said multiplier circuit on an iterative basis; and
- c. a carry-out register, connected to said accumulator circuit, for storing carry-out data;

such that each slice of said bit-sliced multiplier circuit is connected to an adjacent slice only through interconnections of a non-critical nature; and said bit-sliced multiplier circuit further comprising a means for changing a personality of a slice on an iterative basis connected to the multiplier circuit of each slice wherein said connection is of a non-critical nature.

10. The bit-sliced multiplier circuit of claim 9 wherein said interconnections of a non-critical nature include a connection of one slice to the carry-out register of an adjacent slice.

11. The bit-sliced multiplier circuit of claim 9 further comprising a summing register, connected to said accumulator circuit of each slice, for storing results of iterations of each slice after all such iterations are completed.

12. A bit-sliced multiplier circuit, said multiplier circuit comprising:
- A. multiplier slices for independently performing multiplication of a multiplicand with a multiplier on an iterative basis, each of said multiplier slices comprising:
  - (1) a multiplier circuit for forming a product of two numbers on an iterative basis;
  - (2) a partial product register for storing products of past iterations;

(3) an adder circuit, connected to said partial product register and said multiplier circuit, for forming a partial product of a multiplication through the current iteration of the slice;

(4) a carry-out register, connected to said adder circuit, for storing carry-out data from said adder circuit;

such that each slice is connected to an adjacent slice only by interconnections of a non-critical nature;

B. means for changing a personality of a slice on an iterative basis, connected to the multiplier circuit of each slice wherein said connection is of a non-critical nature; and C. a summing register, connected to the partial product register of each slice, for storing results of iterations of each slice after all such iterations are completed.

13. The bit-sliced multiplier circuit of claim 12 wherein a slice's adder circuit includes a carrying input and said interconnections of a non-critical nature include the carry-in input to a slice's adder circuit being connected to the carry-out register of an adjacent slice.

14. A bit-sliced multiplier circuit, said multiplier circuit comprising:

A. multiplier slices for independently performing multiplication of a multiplicand with a multiplier in an iterative fashion, each of said slices comprising:

(1) a multiplicand register for storing one or more multiplicand bits;

(2) a multiplier register for storing one or more multiplier bits;

(3) multiplicand shift and add logic, connected to said multiplicand register and said multiplier register, for forming a product of said multiplicand and multiplier bits;

(4) a partial product register for storing products of past iterations;

(5) an adder circuit, connected to said partial product register and said multiplicand shift and add logic, for forming a partial product of a multiplication through the current iteration of a slice;

(6) a carry-out register, connected to said adder circuit, for storing carry-out data from said adder circuit;

(7) a low order partial result register, connected to said adder circuit, for storing a partial product from a slice's adder circuit after the slice changes personality from that of the least significant slice to that of the most significant slice; such that each slice is connected to an adjacent slice only by interconnections of a non-critical nature;

B. means for changing the personality of a slice on an iterative basis, connected to the multiplicand register of each slice and wherein said connection is of a non-critical nature; and C. a summing register, connected to each slice's partial product register, low order partial result register and carry-out register, for concatenating the contents of the partial product register and low order partial result register and for summing the contents of carry-out register with said concatenation after all iterations are performed in each of the slices.

15. The bit-sliced multiplier circuit of claim 14 wherein a slice's adder circuit includes a carrying input and said interconnections of a non-critical nature include the carry-in input to a slice's adder circuit being connected to the carry-out register of an adjacent slice.

16. A bit-sliced multiplier circuit, said multiplier circuit comprising:

A. a plurality of multiplier slice circuits, each of said multiplier slice circuits comprising:

(1) a personality counter, for indicating a personality of the multiplier slice on an iterative basis;

(2) a multiplicand register for storing one or more bits of a multiplicand;

(3) a multiplier register, for storing one or more bits of a multiplier;

(4) multiplicand shift and add logic, connected to said multiplicand register and said multiplier register, for forming a product of said one or more bits of the multiplicand with said one or more bits of the multiplier;

(5) a partial product register;

(6) a carry-out register for storing a carry-out result from an adder circuit;

(7) said adder circuit, connected to said multiplicand shift and add logic, said partial product register, said carry-out register and an adjacent multiplier slice's carry-out register, for adding contents stored in said multiplicand shift and add logic, said partial product register and said adjacent multiplier slice's carry-out register, and for depositing the result in said partial product register;

(8) a low order partial result register, connected to said personality counter, said adjacent multiplier slice's carry-out register and said adder circuit, for storing a sum of the contents of said adder circuit and the contents of said adjacent multiplier slice's carry-out register after the slice changes personality from that of the least significant slice to the most significant slice;

such that each slice is connected to an adjacent slice only by interconnections of a non-critical nature;

B. means for changing the personality of a slice on an iterative basis, connected to the multiplicand register of each slice wherein said connection is of a non-critical nature; and C. a summing register for concatenating the contents of the partial product register of each multiplier slice and for summing the contents of each adjacent multiplier slice's carry-out register to form the more significant half of the summing register contents and for concatenating the contents of the low order partial result register of each multiplier slice to form the less significant half of the summing register contents.

17. A bit-sliced multiplier circuit, said multiplier circuit comprising a plurality of multiplier slices for independently performing multiplication of a multiplicand with a multiplier on an iterative basis, each of said multiplier slices comprising:

a. a multiplier circuit for forming a product of two numbers on an iterative basis, one of said numbers comprising one or more bits of a multiplier and another of said numbers comprising one or more bits of a multiplicand;

b. an accumulator circuit, connected to said multiplier circuit, for adding and storing the products from said multiplier circuit on an iterative basis; and c. a carry-out register, connected to said accumulator circuit, for storing carry-out data;

such that each slice of said bit-sliced multiplier circuit is connected to an adjacent slice only through interconnections of a non-critical nature;

said multiplier circuit further comprising means for changing a personality of a slice on an iterative basis, connected to the multiplier circuit of each slice, wherein said connection is of a non-critical nature; and said multiplier circuit further comprising means for selecting one or more bits of the multiplier on an iterative basis, said means for selecting connected to the multiplier circuit of each slice, wherein said connection is of a non-critical nature.

18. The bit-sliced multiplier circuit of claim 17 wherein said interconnections of a non-critical nature include a connection of one slice to the carry-out register of an adjacent slice.

19. A bit-sliced multiplier circuit, said multiplier circuit comprising:
A. multiplier slices for independently performing multiplication of a multiplicand and a multiplier on an iterative basis, each of said multiplier slices comprising:
  (1) a multiplier circuit for forming a product of two numbers on an iterative basis, one of said number comprising one or more bits of a multiplicand and the other of said numbers comprising one or more bits of a multiplier, said multiplier circuit including means for storing said one or more bits of a multiplier on an iterative basis;
  (2) a partial product register for storing products of past iterations;
  (3) an adder circuit, connected to said partial product register and said multiplier circuit, for forming a partial product of a multiplication through the current iteration of the slice;
  (4) a carry-out register, connected to said adder circuit, for storing carry-out data from said adder circuit;
  such that each slice is connected to an adjacent slice only by interconnections of a non-critical nature;
B. means for selecting one or more bits of a multiplier on an iterative basis, said means for selecting connected to the means for storing said one or more bits of a multiplier, wherein said connection is of a non-critical nature; and
C. a summing register, connected to the partial product register of each slice, for storing results of iterations of each slice after all such iterations are completed.

20. The bit-sliced multiplier circuit of claim 19 wherein a slice's adder circuit includes a carrying input and said interconnections of a non-critical nature include the carry-in input to a slice'adder circuit being connected to the carry-out register of an adjacent slice.

21. A bit-sliced multiplier circuit, said multiplier circuit comprising:
A. multiplier slices for independently performing multiplication of a multiplicand with a multiplier in an iterative fashion, each of said slices comprising:
  (1) a multiplicand register for storing one or more bits of the multiplicand;
  (2) a multiplier register for storing one or more multiplier bits;
  (3) multiplicand shift and add logic, connected to said multiplicand register and said multiplier register, for forming a product of said multiplicand and multiplier bits;
  (4) a partial product register for storing products of past iterations;
  (5) an adder circuit, connected to said partial product register and said multiplicand shift and add logic, for forming a partial product of a multiplication through the current iteration of a slice;
  (6) a carry-out register, connected to said adder circuit, for storing carry-out data from said adder circuit;
  (7) a low order partial result register, connected to said adder circuit, for storing a partial product from a slice's adder circuit after the slice changes personality from that of the least significant slice to that of the most significant slice; such that each slice is connected to an adjacent slice only by interconnections of a non-critical nature;
B. means for selecting one or more bits of a multiplier on an iterative basis, said means for selecting connected to the multiplier register, wherein said connection is of a non-critical nature; and
C. a summing register, connected to each slice's partial product register, low order partial result register and carry-out register, for concatenating the contents of the partial product register and low order partial result register and for summing the contents of carry-out register with said concatenation after all iterations are performed in each of the slices.

22. The bit-sliced multiplier circuit of claim 21 wherein a slice's adder circuit includes a carrying input and said interconnections of a non-critical nature include the carry-in input to a slice's adder circuit being connected to the carry-out register of an adjacent slice.

23. A bit-sliced multiplier circuit, said multiplier circuit comprising:
A. a plurality of multiplier slice circuits, each of said multiplier slice circuits comprising:
  (1) a personality counter, for indicating a personality of the multiplier slice on an iterative basis;
  (2) a multiplicand register, for storing one or more bits of a multiplicand;
  (3) a multiplier register, for storing one or more bits of a multiplier;
  (4) multiplicand shift and add logic, connected to said multiplicand register and said multiplier register, for forming a product of said one or more bits of the multiplicand with said one or more bits of the multiplier;
  (5) a partial product register;
  (6) a carry-out register for storing a carry-out result from an adder circuit;
  (7) said adder circuit, connected to said multiplicand shift and add logic, said partial product register, said carry-out register and an adjacent multiplier slice's carry-out register, for adding contents stored in said multiplicand shift and add logic, said partial product register and said adjacent multiplier slice's carry-out register, and for depositing the result in said partial product register;
  (8) a low order partial result register, connected to said personality counter, said adjacent multiplier slice's carry-out register and said adder circuit, for storing a sum of the contents of said adder circuit and the contents of said adjacent multiplier slice's carry-out register after the slice changes personality from that of the least significant slice to the most significant slice;

such that each slice is connected to an adjacent slice only by interconnections of a non-critical nature;

B. means for selecting one or more bits of a multiplier on an iterative basis, said means for selecting connected to the multiplier register, wherein said connection is of a non-critical nature; and C. a summing register for concatenating the contents of the partial product register of each multiplier slice and for summing the contents of each adjacent multiplier slice's carry-out register to form the more significant half of the summing register contents and for concatenating the contents of the low order partial result register of each multiplier slice to form the less significant half of the summing register contents.

* * * * *